United States Patent
BeSerra et al.

(10) Patent No.: US 10,896,266 B1
(45) Date of Patent: Jan. 19, 2021

(54) COMPUTER HARDWARE ATTESTATION

(71) Applicant: Amazon Technologies, Inc., Seattle, WA (US)

(72) Inventors: Christopher James BeSerra, Federal Way, WA (US); Gavin Akira Ebisuzaki, Issaquah, WA (US); Ahmed Mohammed Shihab, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 258 days.

(21) Appl. No.: 16/034,188

(22) Filed: Jul. 12, 2018

(51) Int. Cl.
  *G06F 21/73* (2013.01)
  *H04L 29/06* (2006.01)
  *G06F 21/57* (2013.01)

(52) U.S. Cl.
  CPC ........... *G06F 21/73* (2013.01); *G06F 21/575* (2013.01); *H04L 63/062* (2013.01)

(58) Field of Classification Search
  CPC ........ G06F 21/73; G06F 21/575; G06F 21/00; G06F 21/44; G06F 21/81; H04L 63/062
  See application file for complete search history.

(56) References Cited

U.S. PATENT DOCUMENTS

| | | | | |
|---|---|---|---|---|
| 8,209,542 B2* | 6/2012 | Kumar | ............... | G06F 21/57 713/187 |
| 9,807,013 B1* | 10/2017 | Ebisuzaki | ............... | H04L 47/50 |
| 9,930,051 B1* | 3/2018 | Potlapally | ............... | H04L 9/3247 |
| 9,984,021 B1* | 5/2018 | BeSerra | ............... | G06F 13/4054 |
| 10,255,151 B1* | 4/2019 | Levin | ............... | G06F 11/2221 |
| 10,261,880 B1* | 4/2019 | Levin | ............... | G06F 11/2221 |
| 10,303,574 B1* | 5/2019 | Aalund | ............... | G05D 13/62 |
| 10,318,736 B2* | 6/2019 | Scherer, III | ............... | G06F 21/572 |
| 10,346,239 B1* | 7/2019 | Ortega Gutierrez | .... | G06F 11/07 |
| 10,437,754 B1* | 10/2019 | Ebisuzaki | ............... | G06F 13/1668 |
| 10,489,232 B1* | 11/2019 | BeSerra | ............... | G06F 11/0787 |
| 10,599,504 B1* | 3/2020 | BeSerra | ............... | G06F 11/0793 |
| 10,678,721 B1* | 6/2020 | BeSerra | ............... | G06F 11/2221 |
| 10,733,328 B1* | 8/2020 | Perkins | ............... | G06F 21/88 |

(Continued)

FOREIGN PATENT DOCUMENTS

EP       2207120 A2 *  7/2010  ........... G06F 21/575

OTHER PUBLICATIONS

NPL Search (Google Scholar) (Year: 2020).*

*Primary Examiner* — Mahfuzur Rahman
*Assistant Examiner* — Richard W Cruz-Franqui
(74) *Attorney, Agent, or Firm* — Kilpatrick Townsend & Stockton LLP

(57) ABSTRACT

Provided are systems and methods for hardware attestation. Hardware attestation can ensure that only trusted hardware components are being used in a computing system. In various implementations, the computing system can include a hardware component coupled to the motherboard, where the hardware component is independent of the main processor of the computing system. The hardware component can determine whether a particular component connected to the motherboard includes an identification code, where the identification code can be used to attest to an identity of the particular component. The hardware component can further determining whether the identification code matches an expected value. The hardware component can further configure the particular component based on whether the identification code matches the expected value.

22 Claims, 6 Drawing Sheets

(56) References Cited

U.S. PATENT DOCUMENTS

| | | | |
|---|---|---|---|
| 2009/0150528 A1* | 6/2009 | Tanabe | H04L 41/0883 709/221 |
| 2012/0260345 A1* | 10/2012 | Quinn | G06F 21/79 726/26 |
| 2013/0067534 A1* | 3/2013 | Soffer | G06F 21/83 726/2 |
| 2015/0200934 A1* | 7/2015 | Naguib | G06F 21/575 713/2 |
| 2015/0248549 A1* | 9/2015 | Han | G06F 21/44 726/19 |
| 2015/0363590 A1* | 12/2015 | Patel | G06F 21/44 713/182 |
| 2016/0085995 A1* | 3/2016 | Poornachandran | G06F 21/74 726/34 |
| 2016/0179556 A1* | 6/2016 | McGowan | G06F 21/73 710/104 |
| 2016/0359635 A1* | 12/2016 | Kreft | G06F 21/71 |
| 2017/0024570 A1* | 1/2017 | Pappachan | G06F 21/602 |
| 2018/0041341 A1* | 2/2018 | Gulati | H04L 9/3234 |
| 2018/0293387 A1* | 10/2018 | Bar-El | G06F 21/575 |
| 2019/0073478 A1* | 3/2019 | Khessib | G06F 13/4072 |
| 2019/0075186 A1* | 3/2019 | Farhan | G06F 3/0604 |
| 2019/0197261 A1* | 6/2019 | Yu | G06F 21/81 |
| 2019/0236271 A1* | 8/2019 | Shivanna | H04L 9/0897 |
| 2019/0236313 A1* | 8/2019 | Bush | G06F 21/44 |

* cited by examiner

US 10,896,266 B1

COMPUTER HARDWARE ATTESTATION

BACKGROUND

In computing systems, attestation can refer to a process by which the security of a computing component is verified. For example, an attestation process can verify whether firmware code is from a source or vendor that the code purports to be from, and possibly also whether the firmware will not behave in ways that risk the security of the computing system. In this example, the attestation process can ensure that only trusted code is executed within the computing system.

Malicious actors may attempt to infiltrate a computing system through the computing system's network connection, but the network connection is not the only way a computing system can be compromised. For example, by gaining physical access to the computing system, a malicious actor may be able to physically connect a device to the computing system to break through the device's security measures.

BRIEF DESCRIPTION OF THE DRAWINGS

Various embodiments in accordance with the present disclosure will be described with reference to the drawings, in which.

DETAILED DESCRIPTION

Figure 1:
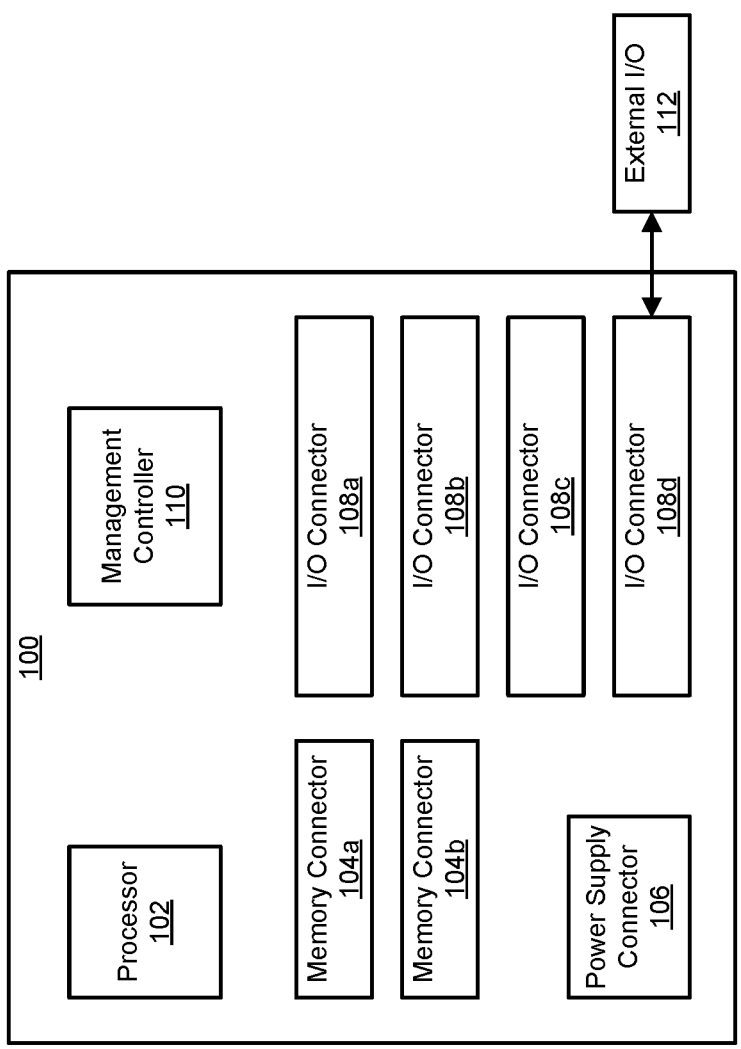
FIG. 1 is a block diagram that illustrates an example computing device that can include a "root of trust" hardware component.

The physical security of a group of computing systems can be more easily ensured when all of the computing systems are under the physical control of the operator of the computing systems. For example, the computing systems that make up a company's network can be located within a building that has physical access controls (e.g., key cards are required to gain access). In this example, when the company makes any changes to the computing systems, such as adding hard drives or memory to a computer, the changes will likely be made by individuals entrusted to maintain the computing systems on behalf of the company, including ensuring that any of the changes do not pose a security risk.

There are situations, however, in which the computing systems of a particular operator may not be under direct physical control of the operator, and/or may be in situations in which others may have physical access to the computing systems. For example, the operator may be a tenant of a data center, meaning that the operating leases space in a data center and places equipment in a physical space that is managed by the data center operator. In this example, another entity may be operating the data center, including controlling physical access to the data center. In this example, multiple tenants may have access to the server rooms and server racks where the tenants' computing systems are housed. In other words, any one tenant may not be able to completely control who has access to the tenant's computing systems. The situation where multiple tenants are housing computing systems in the same physical location can be referred to as a co-location situation.

As another example, the computing systems of one operator may be located in a physical location that is controlled by a different operator. For example, a services provider may be providing services to a customer, and in doing so places computing systems on site with the customer. The site can be, for example, the customer's offices. The customer may also have computing systems in the offices, which are not owned or operated by the services provider. In this example, the services provider may have physical access to the provider's computing systems, but the customer's own personnel, and possibly other individuals, may also have access to the provider's computing systems. The situation where an operator's computing systems are physically located at a site controlled by another can be referred to, in some cases, as an "on-prem" (e.g., "on the premises") situation.

In these and other examples, it may be possible for computing systems to be physically changed, accidentally or on purpose, in ways that cause security breaches. For example, a peripheral device that purports to be an external hard drive can be attached to a computer. The peripheral device, however, may in fact be a wireless network interface that is "spoofing" or made to look like a hard drive from the point of view of the operating system. In this example, the computer's operating system may recognize the peripheral device as a hard drive and store data to the device, which the device then broadcasts for retrieval by a malicious actor. As a further example, the peripheral device may be capable of direct memory accesses, and by virtue of being connected to the peripheral bus structure of the computer, may have access to processor memory. In this example, clever programming of the peripheral device can enable the peripheral device to copy sensitive information from processor memory, such as passwords, personal data, and confidential data.

In various implementations, computing systems enabled with hardware attestation can ensure that only trusted hardware components are being used in a computing system. In various examples, a computing device can be equipped with a hardware component that can function as a "root of trust;" that is, a physical component that can ensure the trustworthiness of other physical components in the computing device. For brevity, the root of trust hardware component will be referred to herein as an attestation device, though this particular component can have other functionality.

In some examples, the attestation device can be an integrated circuit component (e.g., a microchip) that is affixed to the motherboard of the computing device. In some examples, the attestation device can be a peripheral device connected to the computing device. In these and other examples, when the computing system powers on or a device is "hot-plugged" to the system, the attestation device can verify the identity of physical components that are connected to the computing system, including memory, Input/Output (I/O) devices, and power supply systems, among others. When the attestation device determines that another component can be trusted, the attestation device can allow the other component to function as normal. But when the attestation device determines that the other component cannot be trusted, then the attestation device can disable the other component, or otherwise prevent the other component from being available to the computing device. The computing device can, thereafter, carry on as if the untrusted component is not present.

In various examples, to verify whether a component can be trusted, the "root of trust" attestation device can determine whether the component includes an identification code. The identification code can be a numeric or alphanumeric string of characters that can identify a particular component, a location where the component obtained the identification code, the manufacturer of the component, a computing device and/or data center where the component is supposed to be installed, another factor, or a combination of these factors. The attestation device can, for example, read a value from a non-volatile memory location on the component, where the value provides the identification code. In some examples, the identification code can be an encrypted value, for which the attestation device has the corresponding key. In various examples, when the value read from the component matches an expected value, the attestation device can determine that the component is trusted. When the key does not match the expected value, or the attestation device fails to find the key, the attestation device can determine that the component cannot be trusted.

In various examples, different techniques for disabling an untrusted component can be available to the attestation device. For example, the attestation device may be able to disconnect the untrusted component's power source, so that the component powers down. As another example, the attestation device may be able to hold the untrusted component in reset, so that the component does not become fully operational. In some examples, the attestation device may be able to prevent the entire computing system from powering on.

Addition of an attestation device to a computing device can thus enable an operator of a computing device to control the hardware that is available to the computing device. For example, in a co-location situation, the operator can acquire hardware, such as hard drives, and can perform testing and configuration on the hardware including placing an identification code on the hardware. The operator can then send the hardware to the data center, for installation in the operator's computing devices. In this example, the attestation device of the computing device can ensure that the hardware that is installed came from the operator, and not from someone else.

In the description herein, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

FIG. 1 is a block diagram that illustrates an example computing device 100 that can include a "root of trust" hardware component (e.g., an attestation device). In the example of FIG. 1, the root of trust hardware component is a management controller 110, which is described in further detail below. In various examples, the computing device 100 can include the components and infrastructure found in devices such as laptop computers, desktop computers, tablet computers, smart phones, server computers, mainframe computers, and so on. These components and infrastructure can include, for example, a printed circuit board configured as a motherboard (not shown), a processor 102 or multiple processors, memory connectors 104a-104b to which system memory can be connected, a power supply connector 106 to which a power supply can be connected, and I/O connectors 108a-108d to which internal (e.g., within the same chassis) and external (e.g., external to the chassis) peripheral devices can be attached. These and other components can be interconnected using traces on the motherboard (e.g., wires printed on the board), which can function as a processor bus, peripheral device bus, and/or other busses. In various examples, the computing device 100 can include other components, such as various microchips affixed to the motherboard, expansion cards or other printed circuit boards that can be attached to the motherboard, and so on.

In various examples, the processor 102 is an integrated circuit component that can execute program instructions, and can orchestrate the operations of the rest of the computing device 100. The processor 102 can also be referred to as a Central Processing Unit (CPU) In some examples, the computing device 100 can include multiple processors, which can be operating in cooperation with one another. In some examples, the computing device 100 can include other components that are capable of executing program instructions, such as graphics accelerators and peripheral devices that include processor cores. In some examples, the processor 102 can be "hard-wired" to the motherboard, meaning that the pins or connectors on the outside of the processor's packaging are soldered to contact points on the board. In some examples, the processor 102 plugs into a socket that is hard-wired to the board. In some examples, the processor 102 is hard-wired to a printed circuit board, which then plugs into a socket on the motherboard. In various examples, the processor 102 connects to a processor bus on the motherboard, which enables the processor 102 to communicate with other components in the computing device 100.

In various examples, the computing device 100 includes various built-in methods for ensuring the security of the processor 102. For example, when the processor 102 is hard-wired, it is not possible to physically remove the processor 102 from the motherboard, and it is not possible to install a processor that has been tampered with. As another example, in some cases, the motherboard is configured to only accept specific processors. For example, the processor socket may only be configured to accept processors made be a certain manufacturer or, conversely, a processor manufacturer may have only licensed specific motherboard makers to use a socket that can accept the form factor of processors made by the processor manufacturer. As another example, the motherboard can include a hard-wired ROM device that can validate the processor 102 when the computing device 100 powers on. Validation by the ROM device can be both to determine whether the processor 102 is compatible with the board, as well as to determine whether the processor 102 can be trusted. Validation of the processor 102 can be performed, for example, by the Basic Input/Output System (BIOS), which can be stored and executed from a ROM device.

As a further example, during boot procedures, the processor 102 can fetch code, for example from a secure ROM on the motherboard. In this example, the boot code can be encrypted, and the processor 102 would not be able to boot if the processor 102 is not able to decrypt the boot code. Additionally, in this example, the management controller 110 may be able to independently verify the boot code, for example by testing whether the boot code is properly encrypted and includes an expected sequence of operations.

In various examples, the memory connectors 104a-104b enable system memory to be added to the computing device 100. System or processor memory is used by the processor 102 for temporary, short-term storage. For example, the processor 102 can use the system memory to store code that the processor 102 is in the process of executing and/or values on which the processor 102 is presently operating. System memory is often volatile (e.g., a type of Random Access Memory (RAM)), though non-volatile memory technologies can also be used for system memory. For example, solid state memory can be used for system memory. A common physical form factor for system memory is the Dual Inline Memory Module (DIMM). In various examples, memory cards can include a small amount of Read Only Memory (ROM) that stores device information. For example, Serial Presence Detect (SPD) information, which can identify the memory type on the card and any timing information needed to access the memory, can be stored on a ROM. In various examples, the memory connectors 104a-104b connect to a processor bus on the motherboard, and/or to another bus on the board.

While volatile memory loses any data that is stored on the memory once the power is removed, non-volatile memory can retain data when no power is connected to the memory. Thus, non-volatile memory (also referred to as persistent memory) can pose a security risk for the computing device 100. For example, malicious code can be stored on the memory, and once the memory powers on in the computing device 100 the code may execute and cause harm to the computing device 100. Volatile memory types can also pose a security risk. For example, a ROM on a memory card that would normally store device information can be used as a place to store malicious code.

In various examples, the power supply connector 106 enables a power supply to be connected to the computing device 100. The power supply can include a cord for connecting to a standard wall socket, and can provide power to the entire computing device 100. In some examples, the power supply powers the computing device's motherboard and components connected to the motherboard, such as the processor 102, any memory cards attached to the memory connectors 104a-104b, and some peripheral devices connected to the I/O connectors 108a-108d. In some examples, the power supply can include ports or connectors that can separately provide power to components that have greater power requirements, such as internal hard drives.

The power supply is another avenue by which the computing device 100 can be harmed. For example, a malicious actor can connect a power supply to the power supply connector 106 that overloads the computing device 100 and destroys all of the components of the computing device 100. As another example, a power supply can have a small amount of memory, in which malicious code can be stored. In this example, the processor 102 may read the memory to obtain information about the power supply, which can cause the malicious code to be executed. Alternatively or additionally, the power supply may be configured to assert a power fault signal, which can indicate to the computing device that the power supply is not able to provide full power. The computing device can respond by throttling down or reducing the power draw, for example by reducing the processor speed, clock speeds, and/or disabling some devices or features. When used legitimately, the power fault signal can protect the computing device from failing due to lack of power, but when used maliciously, the power fault signal can be used, in essence, to disable the computing device.

In various examples, the I/O connectors 108a-108d enable peripheral devices to be connected to the computing device 100. A peripheral device can extend and/or modify the capabilities of the computing device 100. For example, peripheral devices can include input and output devices, such as monitors, keyboards, mice, printers, network interfaces, hard drives, and so on. In various examples, some of the I/O connectors 108a-108d can have a specific form factor for attaching specific devices, such as D-shaped connectors or round connectors for keyboards, monitors, or printers. In some examples, some of the I/O connectors 108a-108d can have a standardized shape and interface, and can accept any peripheral device that conforms to the standard. For example, the I/O connectors 108a-108d can be Peripheral Component Interconnect (PCI) slots, and can accept any PCI or PCI Express (PCIe) compatible devices. Other examples of I/O connector types that may be found in the computing device 100 include Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), and others.

In some examples, a card (e.g., a printed circuit board) can be attached to one of the I/O connectors 108a-108d, which can enable a peripheral device to be attached to the computing device 100. For example, a card attached to one of the I/O connectors 108a-108d can include Universal Serial Bus (USB) ports, to which USB-capable peripheral devices can be attached.

In some examples, a peripheral device can be connected to the computing device 100 internal to computing device 100, meaning that the peripheral device is housed within the same case or enclosure as the motherboard and processor 102. In some examples, a peripheral device can be externally connected the computing device 100. For example, an external I/O 112 device, such an storage controller, can be attached to a I/O connector 108d on the motherboard using a cable connected to a card, where the card may then be internal to the computing device 100. In this example, the storage controller can connect to external hard drives.

In some examples, the I/O connectors 108a-108d can support "hot-plug" of peripheral devices. Hot-plugging is the process of attaching a device while the system is powered on and in operation. Without a hot-plug system, the computing device 100 needs to be powered down for a hardware component to be added to or removed from the computing device 100. A hot-plug system can include physical connectors among the I/O connectors 108a-108d that can detect when a new device has been attached, and software that is able to add the new device to the list of components known to the computing device's operating system In various examples, the I/O connectors 108a-108d can be connected to a peripherals bus or I/O bus on the motherboard. The I/O bus can enable the processor 102 to communicate with devices connected to the I/O connectors 108a-108d. In some cases, the I/O bus can also enable the devices connected to the I/O connectors 108a-108d to communicate with each other.

Peripheral devices pose a particular security risk for the computing device 100. As an example, the computing device's operating system may rely on identification information provided by a particular device to determine what the device's capabilities are and how the device can be used. For example, the device can include a Media Access Control (MAC) address that identifies the device's manufacturer and can provide a code that can unique identify a particular device. MAC addresses, however, can be easily overwritten, such that a device programmed to do harm to the computing device 100 can pretend to be from a reputable manufacturer (a process referred to as "MAC spoofing"). In this example, the operating system would assume the device to be legitimate and trustworthy, and proceed to load the appropriate device driver and use the malicious device. The malicious device may, for example, be configured to cause the processor 102 to execute ransomware, which can lock down not only the computing device 100, but also any other computing device with which the computing device 100 can communicate over a network.

Hardware spoofing can be a particular problem when an external I/O 112 device can be connected to the computing device 100. When the computing device 100 includes ports for connecting external peripheral devices, the computing device's chassis need not be opened in order to add or remove the device. Attaching a device to the computing device 100 can thus be a simple matter of gaining physical access to the room where the computing device 100 is located. Ports for external devices are often also hot-pluggable, such that a device can be added or removed without powering down the computing device 100.

Data security may be a particular concern. For example, the operator of the computing device 100 may use external hard drives for storing customer data. To ensure the security of the customer data, the operator may use hard drives from a particular manufacturer, which may have been selected because of the reputation of the manufacturer and security features provided by the manufacturer. But without a hardware attestation system, the operator may be unable to ensure that only the operator's approved hard drives have been attached to the computing device 100. For example, if someone else has physical access to the computing device 100, any hard drive can be connected to the computing device 100, including ones with no security features. Without the security features, the operator may be in violation of the operator's agreement with the customers to keep the customers' data secure. Additionally, the lack of the security features may enable a malicious actor to steal the data.

In various implementations, the management controller 110 can perform hardware attestation, and thereby attempt to ensure that any component attached to the computing device 100 can be trusted. The management controller 110 can also be referred to as a Baseboard Management Controller (BMC). In various examples, the management controller 110 is an integrated circuit device that is hard-wired to the computing device's motherboard. Alternatively, in some examples, the management controller 110 is an integrated circuit device that plugs into a special-purpose socket that is hard-wired to the motherboard. The management controller 110 can include a processor core and firmware that is executed by the processor core. The management controller 110 can be implemented, for example, as an Application Specific Integrated Circuit (ASIC), a Field Programmable Gate Array (FPGA), or another type of integrated circuit. In various examples, the management controller 110 includes a memory on which firmware or microcode is stored. In some examples, the management controller 110 can obtain firmware code or microcode from a ROM device mounted to the motherboard. In addition to hardware attestation, the management controller 110 may be able to perform other operations, such as firmware attestation.

In various examples, the management controller 110 operates independently from the processor 102. For example, the management controller 110 can be self-starting, such that neither the BIOS or the system's operating system need to be running for the management controller 110 to be able to boot and begin executing code. In some examples, the management controller 110 can perform the operations of a BIOS, in place of a separate BIOS chip. As another example, the management controller 110 can be self-configuring. For example, components in the computing device 100, particularly peripheral devices, may need to be configured by the processor 102 when the computing device 100 powers on before these components are able to function. For example, the processor 102 may need to assign address spaces to the devices. The firmware of the management controller 110, however, can include a micro-coded operating system, or some other self-starting mechanism, such that the management controller 110 does not need to be configured by the processor 102 in order to begin operating. Additionally, in some examples, the management controller 110 may not be readable and/or writeable by the processor 102, to avoid the possibility that the operations of the management controller 110 can be tampered with.

In various implementations, the management controller 110 can include other features that can isolate the management controller 110 from other components in the computing device 100 and thereby make the management controller 110 more secure. For example, the management controller 110 can receive power from a different source than the power supply connector 106, such as a battery on the motherboard or a secondary power cable connected to the computing device 100. Having a separate power source can avoid the management controller 110 being subject to power supply tampering. As another example, the management controller 110 can include a network interface, so that the management controller 110 can communicate with a network without using a network interface of computing device 100. The management controller 110 can use the network interface to communicate with other management controllers in other computing devices, and/or with network administrators.

In various examples, in order to perform hardware attestation and other operations, the management controller 110 can be connected to the various busses in the computing device 100. For example, the management controller 110 can be connected to the processor bus, the peripherals bus, and/or the power supply infrastructure on the motherboard. Being connected to these busses can include tapping in to the wires of a bus. In some examples, the management controller 110 does not occupy the bus as a legitimate device, so that other devices on the bus may not recognize the management controller 110 as an ordinary device on the bus. Alternatively or additionally, the management controller 110 can be a bus master on the bus, and thereby possibly have overriding control over signals on the bus.

In various implementations, to determine whether any component that is attached to the computing device 100 can be trusted, the management controller 110 can look for an identification code that can be stored on the component. The identification code can be a numeric or alphanumeric string of characters that can uniquely identify the component, the manufacturer of the component, the place where the component was certified (e.g., the location were the identification code was stored on the component), the computing device to which the component is supposed to be attached, some other information that indicates the component can be trusted, or a combination of the preceding information. In some examples, the identification code can be encrypted, such that the management controller 110 will decrypt the value the management controller 110 retrieves from the component to obtain the identification code.

In various examples, the identification code can be stored in a non-volatile memory on the component. As noted above, the computing device 100 can include physical components such as memory cards connected to the memory connectors 104a-104b, a power supply that is connected to the power supply connector 106, and various peripheral devices that are connected to the I/O connectors 108a-108d. A memory card, for example, can include a small amount of non-volatile memory, such as a ROM, for information such as a device identifier or an indicator of the size of the memory on the card. In this example, the identification code can be stored in the memory card's non-volatile memory.

Power supplies, as another example, can exchange information with the processor 102 using a set of wires on the computing device's motherboard and a bus protocol such as Power Management Bus (PMBus). The bus protocol can specify that a power supply have a small set of registers (e.g., non-volatile memory), from which the processor 102 can read device attributes and to which the processor 102 can write commands for the power supply to follow. In this example, the identification code can be stored in a location in the power supply's registers.

Peripheral devices have a wide range of options for locations to store the identification code. PCI-based components, for example, have (as provided by the PCI standard) a non-volatile memory space that stores information such as a device identifier, a vendor identifier, a subsystem identifier, and a subsystem vendor identifier, among other things. This memory space is referred to as the configuration space. In some examples, a combination of the device identifier, vendor identifier, subsystem identifier, and/or the subsystem vendor identifier, or other information stored in the configuration space, can be used as the identification code.

Values in the PCI configuration space, however, are visible to any device that can read the configuration space, may be writeable, and are generally not encrypted. Thus, in various examples, in some PCI devices the identification code can be placed in a device's extended configuration space. The extended configuration space is an additional memory space whose use can be defined in various ways. The extended configuration space is part of the PCIe standard, for example. In some examples, the initial address locations in the extended memory space include a list of extended capabilities, where a capability is an encoded description of something the device can do, optionally followed by some stored information about the capability, and a pointer to an address of the next capability. In various examples, the identification code can be stored in the extended configuration space, as a hidden capability. For example, the capabilities list can include a capability that includes the identification code and whose encoded description is only recognized by the management controller 110. Alternatively, as another example, the encoded description can be for a known capability, but the information stored for the capability can be encrypted or otherwise be nonsensical to any device other than the management controller 110. Alternatively, as another example, a capability that includes the identification code can be the last capability in the list, and in the immediately preceding capability, which includes a pointer to the address of the last capability, the address can be stored encrypted or encoded. Various other methods can be used to obfuscate the identification code and/or the identification code's location in the extended configuration space.

The computing device 100 can have peripheral devices other than PCI-based devices, such as SCSI, SAS, SATA, or PATA devices, among others. These and other types of peripheral devices can also include a non-volatile memory that stores device information and receives configuration data from the processor 102. In various examples, the identification code can be stored in this non-volatile memory.

In various examples, once the management controller 110 has the identification code, the management controller 110 can compare the identification code against an expected value that is stored on the management controller 110. In some examples, a list or manifest can be stored on the management controller 110, where the list includes expected values for components that are expected to be found in the computing device 100. In some examples, the manifest is loaded onto the management controller 110 when the computing device 100 is built. In some examples, the management controller 110 can obtain expected values and encryption keys from a trust network. For example, using a network interface built in to the management controller 110, the management controller 110 can communicate with a security server that periodically sends keys and identification codes to the management controller 110. The security server can be a computing system that is physically controlled by the operator of the computing device 100. In some examples, when the management controller 110 reads an identification code for which the management controller 110 does not have an expected value, the management controller 110 can request new expected values from the security server, or can send the unknown identification code to the security server for verification. In the latter situation, the management controller's determination as to whether the component can be trusted depends on the response from the security server.

In various examples, when the identification code matches the expected value, the management controller 110 determines that the component can be trusted. For a trusted component, the management controller 110 need not take further action, and can let the component boot as normal. Alternatively, in some examples, the management controller 110 can perform firmware attestation on the component (when the component has firmware), before allowing the component to become functional. When the identification code does not match the expected value, or the management controller 110 does not find the identification code (encrypted or otherwise) on the component, then the management controller 110 determines that the component cannot be trusted, and should be disabled.

To disable an untrusted component, the management controller 110 can have access to several different mechanisms. For example, the management controller 110 can be connected to the power management system on the motherboard. In this example, the management controller 110 may be able to disconnect the power signal to the untrusted component. As another example, the management controller 110 can be coupled to reset signals on the motherboard, and can hold the untrusted device in reset (e.g., force the signal to the reset value) so that the untrusted device is not able to become fully operational. In these and other examples, because the untrusted device does properly boot, the computing device's BIOS and/or operating system may fail to recognize the untrusted device, and thus may avoid adding the untrusted device as a known component of the computing device 100. The computer device 100 may otherwise be able to continue operating.

As another example, the management controller 110 can prevent the entire computing device 100 from powering on. For example, the management controller 110 may be able to disconnect the primary power supply, so that the motherboard is not powered. As another example, the management controller 110 may be able to disconnect power to the processor 102, thus preventing the processor 102 from booting an operating system.

In various examples, the management controller 110 verifies the components in the computing device 100 before an operating system boots on the processor 102, and possibly before the BIOS activates. One of the first operations the BIOS and/or the operating system performs is to identify each hardware component in the computing device 100 so that the capabilities of the computing device 100 are understood. In some examples, this operation, often referred to as discovery or device discovery, can include reading registers on the components to obtain information about the components (e.g., a manufacturer's identifier, a device identifier, a capabilities list, etc.) and/or configuring the components. If any hardware component cannot be trusted, then it may be desirable to prevent the BIOS and/or the operating system from accessing this component. Thus, the management controller 110 may be configured to power on before the rest of the computing device powers on. The management controller 110 can have an independent power source (e.g., a source other than the motherboard) for this purpose.

In various examples, the management controller 110 can, alternatively or additionally, verify components that are hot-plugged after the computing device 100 is powered on and running. For example, the management controller 110 can be connected to the peripherals bus, so that when a hot-plug occurs, the management controller 110 can detect the occurrence. Hot-plugging can involve a physical switch being triggered, either by the human operator that is attaching the device or by the device itself as the device is inserted (e.g., the device has a physical arm, lever, pin, or other mechanism that triggers a button or switch on one of the I/O connectors 108a-108d, or connects to a contact point in the connector). In some examples, the management controller 110 can be wired to the switch, and/or can be connected to the peripherals bus and thus be able to detect the hot-plug event in the same way that the processor 102, for example, detects the event.

In some examples, once the management controller 110 detects that a device has been hot-plugged to one of the I/O connectors 108a-108d, the management controller 110 can look for an identification code on the device, and can verify that the identification code is as expected, if the identification code is found. In some examples, during this process, the management controller 110 can allow power to go to the device, but can keep the device disconnected from the peripherals bus, so that the computing device's hot-plug mechanism does not yet detect the device, or is not able to read the device. For example, the management controller 110 can disconnect the physical switch that indicates that a hot-plug has occurred. When the device's identification code is as expected, then the management controller 110 can allow the device to connect to the peripherals bus, and thus be discovered by the operating system. When the device's identification code is not as expected, or the management controller 110 does not find an identification code, then the management controller 110 can disable the device in various ways. For example, the management controller 110 can disconnect the switch that indicates that a hot-plug occurred. As another example, the management controller 110 can use the hot-plug mechanism that provides power to the device to disconnect the power. In these and other examples, the device can be prevented from booting, and/or the computing device's hot-plug system can be prevented from detecting the device and attempting to use the device.

In various examples, once the management controller 110 has verified each component in the computing device 100, the computing device 100 can boot and operate as normal. Additionally, in some implementations, the management controller 110 can store a list of the components that the management controller 110 has identified as being attached to the computing device 100. In these implementations, the management controller 110 can later verify if any of the components have changed. For example, peripheral devices attached to the computing device can include a storage controller, to which a number of storage devices can be attached. In this example, the management controller 110 can verify the storage controller and each of the storage devices attached to the storage controller, and can store identification codes for each of the storage devices. Later, one of the storage devices maybe replaced with a new storage device. In this example, the management controller 110 can recognize that the old storage device is no longer present, and can raise an alert, regardless of whether the new storage device has a valid identification code. In this way, the operator of the computing device can have a digital record of instances when storage devices have been replaced. Additionally, the operator can be given the opportunity to approve the new storage device for use.

In addition to incapacitating an untrusted device, in some examples, the management controller 110 can also issue an alert. The alert can take the form of, for example, a message sent using the network interface of the management controller 110, which can be received by a security server or another administrative system. As another example, the alert can take the form of a flashing light on the exterior of the computing device 100, or a beeping noise, or another physical indicator.

In some examples, when the operator of the computing device 100 is alerted that an untrusted component connected to the computing device 100, the operator can approve the untrusted device for use. For example, it may be that the untrusted component has an identification code, but that the management controller's manifest of identification codes is out of date. In this and other examples, the operator can transmit a message to the management controller 110, which indicates to the management controller 110 to allow the untrusted device to become functional. In some examples the management controller 110 can receive the message at the management controller's onboard network interface. In some examples, the management controller 110 can also add the untrusted device's identification code to the list of expected values.

The management controller 110 can thus attempt to ensure that the untrusted hardware components that are added to the computing device 100 are disabled. Components that are added with malicious intent can thus be prevented from becoming operational in the computing device 100. Similarly, components that the operator of the computing device 100 has not specifically approved can be prevent from being used by the computing device 100, for performance reasons, quality assurance reasons, or other reasons.

Figure 2:
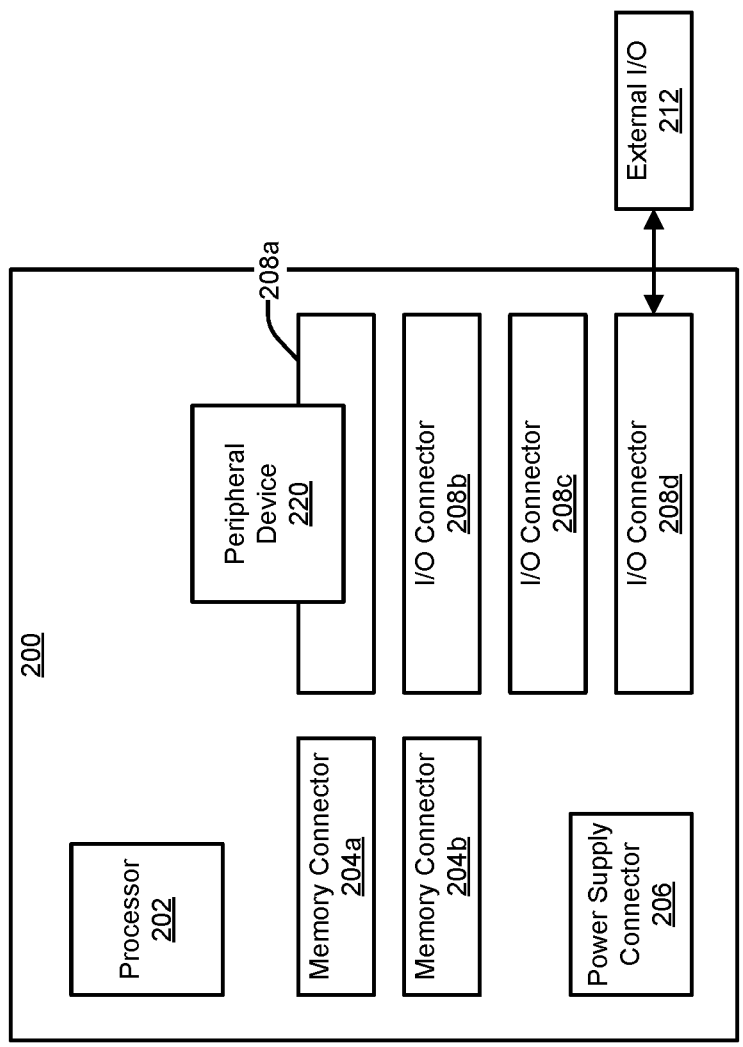
FIG. 2 is a block diagram illustrating another example computing device that can include a "root of trust" hardware component.

FIG. 2 is a block diagram illustrating another example computing device 200 that can include a "root of trust" hardware component (e.g., an attestation device). In this example, the root of trust hardware component is a peripheral device 220 connected to an I/O connector 208a. The peripheral device 220 can be, for example, a card (e.g., a printed circuit board) that includes one or more integrated circuit components (e.g., ASICs, FPGAs, memory chips, or another type of integrated circuit component). In various examples, the peripheral device 220 is configured to be an internal component to the computing device 100 (e.g., the peripheral device 220 is housed in the same enclosure as the computing device's motherboard). In some examples, the peripheral device 220 has a separate enclosure, and attaches to the I/O connector 208*a* external to the computing device 200.

The computing device 200 can further include the components and infrastructure found in devices such as laptop computers, desktop computers, tablet computers, smart phones, server computers, mainframe computers, and so on. These components and infrastructure can include, for example, a printed circuit board configured as a motherboard (not shown), a processor 202 or multiple processors, memory connectors 204*a*-204*b* to which system memory can be connected, a power supply connector 206 to which a power supply can be connected, and I/O connectors 208*a*-208*d* to which internal (e.g., within the same chassis) and external (e.g., external to the chassis) peripheral devices can be attached. These and other components can be interconnected using traces on the motherboard (e.g., wires printed on the board), which can function as a processor bus and/or peripheral device bus. In various examples, the computing device 200 can include other physical components.

In various examples, the processor 202 is an integrated circuit component that can execute program instructions, and can orchestrate the operations of the rest of the computing device 200. In some examples, the computing device 200 can include other components that are capable of executing program instructions. In some examples, the processor 202 can be "hard-wired" to the motherboard, meaning that the pins or connectors on the outside of the processor's packaging are soldered to contact points on the board. In some examples, the processor 202 plugs into a socket that is hard-wired to the board. In various examples, the processor 202 connects to a processor bus on the motherboard, which enables the processor 202 to communicate with other components in the computing device 200.

In various examples, the memory connectors 204*a*-204*b* enable system memory to be added to the computing device 200. System memory (also referred to herein as processor memory) can be volatile or non-volatile. In various examples, the memory connectors 204*a*-204*b* connect to a processor bus on the motherboard, and/or to another bus on the board.

In various examples, the power supply connector 206 enables a power supply to be connected to the computing device 200. The power supply can include a cord for connecting to a standard wall socket, and can provide power to the entire computing device 200. In some examples, the power supply powers the computing device's motherboard and components connected to the motherboard, such as the processor 202, any memory cards attached to the memory connectors 204*a*-204*b*, and some peripheral devices connected to the I/O connectors 208*a*-208*d*. In some examples, the power supply can include ports or connectors that can separately provide power to components that have greater power requirements, such as internal hard drives.

In various examples, the I/O connectors 208*a*-208*d* enable peripheral devices to be connected to the computing device 200. Examples of peripheral devices include monitors, keyboards, mice, printers, network interfaces, hard drives, and so on. In various examples, some of the I/O connectors 208*a*-208*d* can have a specific form factor for attaching specific devices. In some examples, some of the I/O connectors 208*a*-208*d* can have a standardized shape and interface, and can accept any peripheral device that conforms to the standard. For example, the I/O connectors 208*a*-208*d* can be PCI slots, and can accept any PCI or PCIe compatible devices.

In some examples, a peripheral device can be connected to the computing device 200 internal to computing device 200 or external to the computing device 200. For example, an external I/O 212 device, such an storage controller, can be attached to a I/O connector 208*d* on the motherboard using a cable connected to a card, where the card may then be internal to the computing device 200. In this example, the storage controller can connect to external hard drives. In some examples, some of the I/O connectors 208*a*-208*d* can support hot-plugging, meaning that devices can be hot-plugged to these connectors.

In various implementations, the peripheral device 220 can perform hardware attestation to attempt to ensure that any physical component that is attached to the computing device 200 can be trusted. In various examples, the peripheral device 220 can include an integrated circuited that is capable of executing firmware or microcode, where the code includes instructions for performing hardware attestation.

In various examples, the hardware attestation steps performed by the peripheral device 220 are similar to the steps performed by the management controller 110 of FIG. 1. For example, the peripheral device 220 of FIG. 2 can detect each of the physical components attached to the computing device 200, and can look for an identification code stored on each component. The identification code can be located in a non-volatile memory location on a memory card, power supply, or peripheral device, as discussed above. In some cases, the value the peripheral device 220 reads from a component is encrypted, and can be decrypted by the peripheral device 220 to obtain the identification code. Once the peripheral device 220 has obtained an identification code from the component, the peripheral device 220 can check whether the identification code matches an expected value. When the identification code matches the expected value, the peripheral device 220 may not need to perform any further actions with respect to the component. When the identification code does not match, or the peripheral device 220 is unable to find the identification code on the component, then the peripheral device 220 can perform steps to disable the component.

To disable an untrusted component, in one example, the peripheral device 220 can be in communication with a controller chip on the motherboard, and the controller chip can be connected to the various busses on the motherboard (e.g., the processor bus, the peripherals bus, and/or the power supply system among others). In this example, the peripheral device 220 can instruct the controller chip to disable the power supply to the untrusted component, and thereby disable the untrusted component from powering on. Alternatively or additionally, the peripheral device 220 can instruct the controller chip to hold the untrusted component in reset, so that the untrusted device is not able to boot. In these and other examples, though the peripheral device 220 is connected, through the I/O connector 208*a*, to the peripherals bus, communication with the controller chip can give the peripheral device 220 the ability to disable other untrusted components. In some examples, a Complex Programmable Logic Device (CPLD) can be used to implement the controller chip.

In various examples, the peripheral device 220 can also verify any peripheral devices that are hot-plugged into the computing device 200. For example, the peripheral device 220 the device's connection to the peripheral device to recognize when a hot-plug has occurred. A signal can be sent, for example, when a new device is attached. In these examples, the peripheral device 220 can look for an identification code on the new device, and when no identification code is found, or the identification code does not match an expected value, then the peripheral device 220 can use the hot-plug mechanism to disable the new device. The peripheral device 220 can, for example, hold the new device in reset or disconnect the power from the new device.

In various implementations, the peripheral device 220 can communicate with a trust network in order to obtain encryption keys and expected values for comparing to identification codes. The peripheral device 220 can include, for example, a network interface, through which the peripheral device 220 can communicate with a security server. The security server can periodically provide encryption keys and updated expected values to the peripheral device 220. In various examples, the security servicer is controlled by the operator of the computing device 200.

In various implementations, though the peripheral device 220 is on the peripherals bus, the peripheral device 220 can become active before the processor 202 boots an operating system. For example, as soon as the peripheral device 220 receives power through the I/O connector 208a, the peripheral device 220 can self-configure and begin operations. In some examples, those operations can include taking control of the peripherals bus, for example by holding the peripheral bus in reset, holding on to a request signal, or performing another operation that can prevent the processor 202 from conducting discovery operations on the peripherals bus. the peripheral device 220 can then perform attestation steps, and once all the hardware components are verified, can release control of the peripherals bus.

The peripheral device 220 can thus provide an additional or alternative mechanism for hardware attestation.

Figure 3:
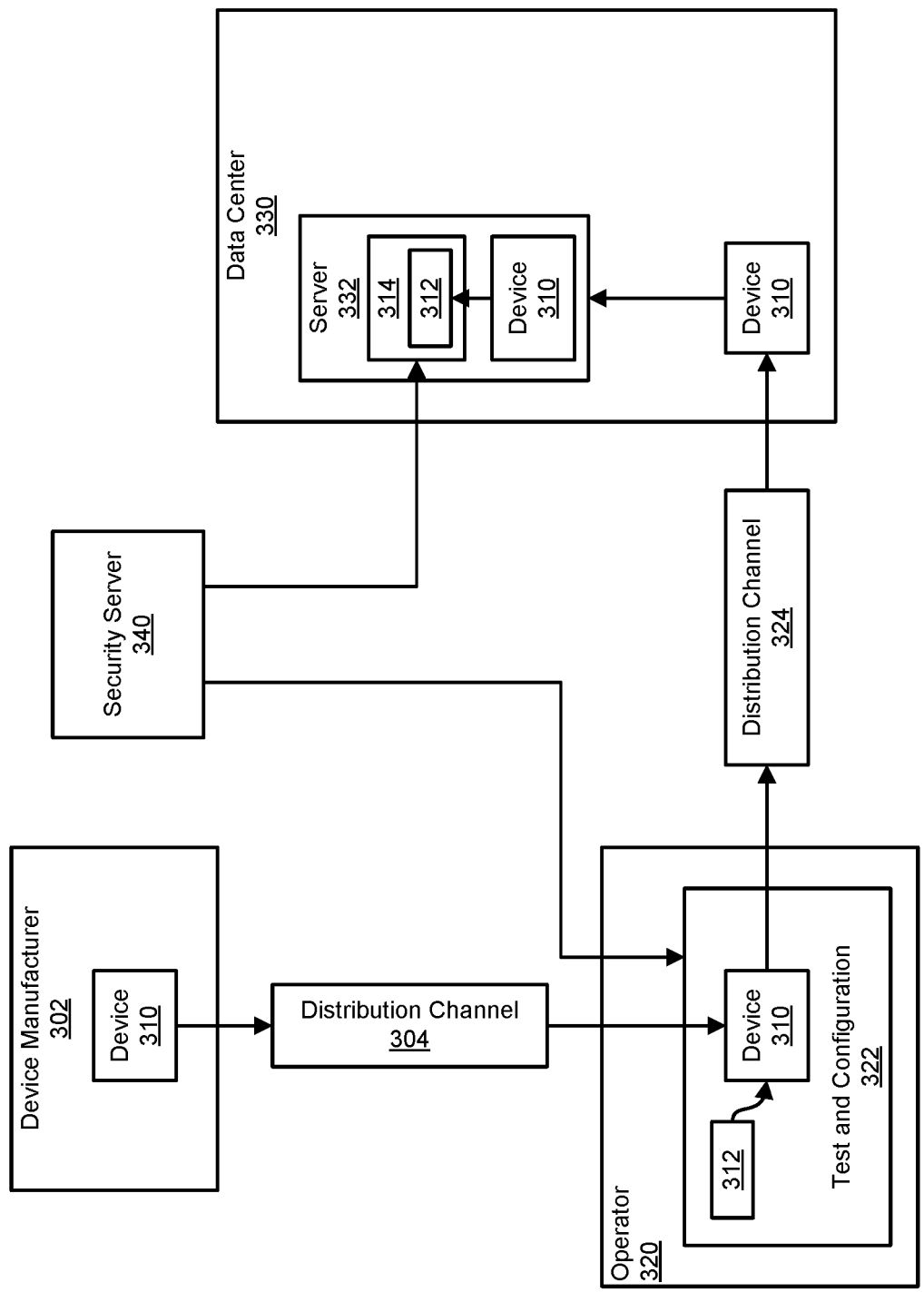
FIG. 3 is a block diagram illustrating a process by which a device can be obtained by an operator who has a server in a data center.

FIG. 3 is a block diagram illustrating a process by which a device 310 can be obtained by an operator 320 who has a server 332 in a data center 330. In various examples, the operator 320 may be leasing physical space in the data center 330, and can have many physical servers and other hardware in the data center 330. In these examples, the operator 320 may provision the server 332, including providing the hardware, installing the hardware, and/or configuring the hardware and/or software of the server. In some examples, the data center operator may install hardware provided by the operator 320, and possibly also do some initial configuration of the hardware. In some examples, besides employees of the data center 330 operator, other individuals can have access to the physical location of the server 332. For example, other tenants in the data center 330 may have servers in the same physical location.

In the example of FIG. 3, a data center 330 is used as an example of a situation where an operator 320 may not have exclusive physical control of the operator's computer hardware. Other situations can occur where the operator 320 is not able to prevent personnel who are not acting on behalf of the operator 320 from accessing the operator's computer hardware, such as an on-prem situation, for example.

In various examples, the operator 320 can obtain a device 310 from a device manufacturer 302, which the operator 320 obtains for attaching to and using with the server 332 in the data center 330. The device manufacturer 302 can be, for example, one that manufacturers devices for sale to any individual or company. In these examples, the device manufacturer 302 can be unaffiliated with either the operator 320 or the data center 330, or the device manufacturer 302 may have a contract with the operator 320 to produce devices for the operator 320.

In various examples, once the device manufacturer 302 has manufactured the device 310, the device 310 is physically transferred to the operator 320 over a first distribution channel 304. The distribution channel 304 can include many locations that are controlled by neither the device manufacturer 302 nor the operator 320, and thus can be places where the device 310 can be tampered with or otherwise be altered in an undesirable way. The distribution channel 304 can include, for example, shipping company, one or more warehouses, a retail location, other shipping or transportation services, and/or various other locations. In any of these locations, a malicious actor may be able load malicious code on the device 310. Alternatively, the device 310 may be intentionally or accidentally swapped with another device, which may not be precisely the device desired by the operator 320.

For these and other reasons, once the device 310 reaches the operator 320, the operator 320 may subject the device 310 to a test and configuration 322 procedure. Testing can include ensuring that the device 310 functions as expected and is free of viruses or other malicious code. Testing can alternatively or additionally include firmware attestation; that is, verifying that any firmware loaded on the device 310 is the expected firmware, the correct firmware version, and/or firmware that is free of viruses, among other operations. Configuration can include adding physical components and/or removing physical components from the device 310. Configuration can alternatively or additionally include loading firmware or microcode onto the device 310.

In various examples, configuration can also include storing an identification code 312 on the device 310. The identification code 312 can be, for example, a code that is to be unique to the device 310, a code that identifies the physical location of the test and configuration 322 platform, a code that identifies the server 332 and/or the data center 330 as the destination for the device 310, another factor, or a combination of these factors.

In various examples, the test and configuration 322 platform can obtain the identification code 312 from a security server 340 that keeps track of identification codes. The security server 340 can, for example, be located in the same physical location as the test and configuration 322 platform, and the security server 340 may be able to communicate with 322 over a local area network. Alternatively, the security server 340 may be in a different physical location from the test and configuration 322, which is controlled by the 302, and be able to access the test and configuration 322 bed over various networks. In these and other examples, the security server 340 may use a secure communication channel to communicate with the test and configuration 322 platform.

In various examples, the security server 340 can also provide encryption keys to the test and configuration 322 platform. The security protocol followed by the security server 340 can include periodically providing new encryption keys, to avoid the chance that the previous encryption keys have been obtained by another entity. In these examples, the test and configuration 322 platform can encrypt the identification code 312 before storing the identification code 312 on the device 310.

In various examples, once the device 310 has passed the test and configuration 322 procedure, the operator 320 can send the device 310 to the data center 330 for installation in the server 332. To reach the data center 330, the device 310 may be physically transferred over a second distribution channel 324. Similar to the first distribution channel 304, the distribution channel 324 can include various physical locations, at which the device 310 can be altered or tampered with.

Once the device 310 reaches the data center 330, personnel from the operator 320 or the data center 330 can attach the device 310 to the server 332. In some cases, the server 332 is powered down and opened for the device 310 to be attached. In some cases, the device 310 can be hot-plugged to the server 332 while the server is in operation. In some cases, the server 332 is not powered down but may be put into an idle state while the process of attaching the device 310 occurs.

One the device 310 is attached to the server 332, in various examples, a hardware component 314 of the server 332 can verify whether the device 310 can be trusted. For example, as discussed previously, the hardware component 314 can attempt to read the identification code 312 from the device 310. When the hardware component 314 finds the identification code 312, the hardware component 314 can verify whether the identification code 312 matches an expected value. In various examples, the security server 340 can obtain the expected value from the security server 340. For example, the hardware component 314 can use a network connection to receive expected values. Alternatively or additionally, the hardware component 314 can be preloaded with expected values when the server 332 is first assembled and brought online.

In various examples, the hardware component 314 can alternatively or additionally obtain encryption keys from the security server 340. In these examples, the security server 340 can ensure that the test and configuration 322 platform and the hardware component 314 are using the same encryption keys and/or encryption keys that are compatible with one another. The hardware component 314 can use the encryption keys to decrypt a value read from the device 310, which, once decrypted, can provide the identification code 312.

As noted above, when encryption key matches the expected value, the hardware component 314 can let the device 310 boot and function normally. When the encrypt key does not match, or the hardware component 314 fails to find the identification code 312 on the device 310, the hardware component 314 can disable the device 310 (e.g., by holding the device 310 or disabling a power connection to the device 310) or can disable the entire server 332. In these and other examples, the hardware component 314 can also issue an alert to indicate that an untrusted component has been added to the server 332.

In examples other than the example illustrated in FIG. 3, the device manufacturer 302 may place the identification code 312 on the device 310. For example, the device manufacturer 302 can provide encrypted identification codes to the device manufacturer 302, and/or can connect the device manufacturer 302 to the security server 340. In this example, the device manufacturer 302 can also have a test and configuration 322 platform that the device manufacturer 302 can use to put an encrypted identification code on the device 310.

In yet other examples, the operator 320 may also be the manufacturer of the device 310. For example, the operator 320 can operate a factory that produces devices for exclusive use by the operator 320, and/or for sale or distribution to others. In this example, the first distribution channel 304 is no longer part of the process of provisioning a component for the server 332.

Figure 4:
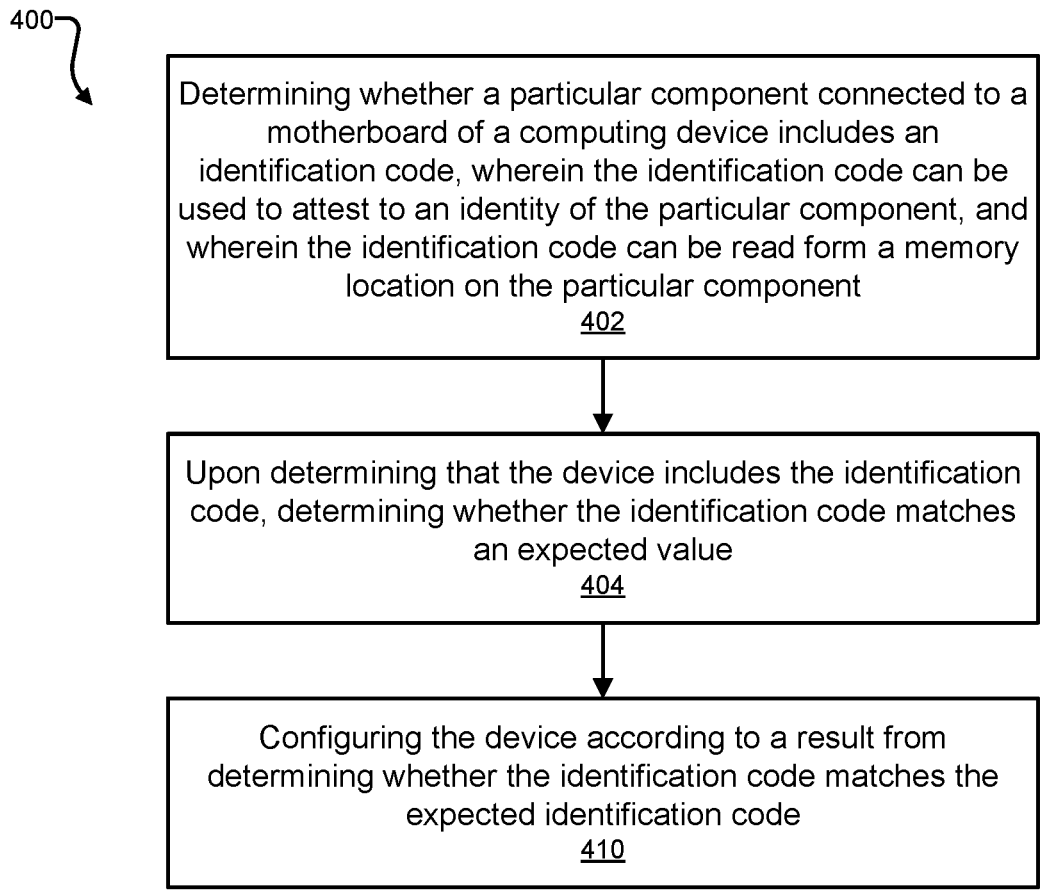
FIG. 4 includes a flowchart illustrating an example of a process for performing hardware attestation.

FIG. 4 includes a flowchart illustrating an example of a process 400 for performing hardware attestation. These methods may be implemented by the systems described above, such as, for example, the computing devices illustrated in FIGS. 1, 2, and 3. For example, in various implementations, a computing device can include a hardware component (e.g., an attestation device) that is capable of performing the process 400.

At step 402, the process 400 includes determining whether a particular component connected to a motherboard of a computing device (e.g., the computing device to which the hardware component is coupled) includes an identification code, wherein the identification code can be used to attest to an identity of the particular component, and wherein the identification code can be read from a memory location on the particular component. In various examples, the identification code can be stored in a non-volatile memory on the device. In some examples, the identification code is stored on the device as an encrypted value. In various examples, the hardware component can be configured with an address that identifies the memory location, or a procedure (e.g., a set of instructions for reading the particular component) that enables the hardware component to read the memory location. In various examples, the hardware component can be configured to expect to find the memory location in different places on different types of devices. For example, the hardware component can be configured with a first address that the hardware component uses to read memory cards, and a second address the hardware component uses to read disk drives.

In various examples, the hardware component includes a processor that is separate from a central processing unit of the computing device. In some examples, the hardware component is an integrated circuit affixed to a motherboard of the computing device. Affixed can mean, for example, that the hardware component is soldered to the motherboard. Alternatively, affixed can mean that the hardware component plugs into a socket that is itself soldered or otherwise fastened to the motherboard. In some examples, the hardware component is a peripheral device connect to a slot on a motherboard of the computing device. For example, the hardware component can be a PCIe card. In each of these examples, the hardware component can execute code, and can do so independently of the central processing unit of the computing device.

In various examples, devices that can be directly coupled to the computing device include a memory card, a power supply component, or an input/output device (also referred to as a peripheral device). Memory cards, for example, can connect to the computing device at a memory card slot affixed to the computing device's motherboard. A power supply component can connect to the computing device at a power supply connector on the motherboard, as well as directly connecting to other devices in the computing device, such as drives. Peripheral devices can connect to the computing device at various connectors, such as D-connectors and USB connectors affixed to the motherboard, or expansion slots (also referred to as I/O connectors) affixed to the motherboard.

In some examples, the hardware component may identify the hardware components are directly coupled to the computing device prior to determining whether the particular component includes an identification code. To identify the hardware components of the computing device, the hardware component, for example, can be connected to busses on the motherboard, such as a processor bus or a peripherals bus, and can conduct device discovery operations that are similar to the discovery operations conducted by the BIOS chip or the main processor. For example, the hardware component may be able to issue I/O transactions onto a peripherals bus, which may be a PCI bus, where the I/O transactions test for the presence of devices at various slots on the motherboard. As another example, the hardware component can be connected to a bus that may be connected to all the devices in the computing device, such as an Inter-Integrated Circuit (I2C) bus. In this example, the hardware component can use the I2C bus to conduct device discovery, for example, by testing whether a thermal sensor can be found at various addresses. As another example, the hardware component can be connected to a Platform Environmental Control Interface (PECI), which can be used for thermal monitoring of the components in the computing device. In this example, the hardware component can test thermal sensors in the PECI system to determine which components are present.

In various examples, the hardware component can identify components coupled to the computing device when the computing device is powered on. For example, the hardware component can power on before the rest of the components in the computing device, including the BIOS system and the main processor, and conduct device discovery before discovery is performed by the BIOS or operating system. In various examples, the hardware component can, alternatively or additionally, identify the device when the hardware components detects that the device has been hot-plugged to the computing device. For example, the hardware component may be able to detect a signal or physical trigger that occurs when a device is physically attached to the computing device.

In some examples, determining whether the particular component includes the identification code includes determining that a valid value is stored at the memory location. Whether the value is valid can be determined, for example, by a valid bit associated with a memory location. Alternatively or additionally, the value may be valid when the memory location is readable, and may not be valid when the memory location is not readable. In some examples, the hardware component can read a value from the memory location without being aware whether the value is an identification code, and can only verify that the value is an identification code when the value matches an expected value.

In some examples, determining whether the particular component includes the identification includes determining that the memory location is not being used for another purpose. For example, the hardware component may be able to check the configuration of the particular component, and from the configuration determine that the memory location is being used to store configuration data, program code, device settings, or some other data related to the operation or configuration of the particular component, a feature of the particular component, or some purpose that cannot be identified by the hardware component. In these and other examples, the hardware component will determine that the particular component does not include an identification code.

In various examples, the identification code provides a unique identifier for the device. For example, the identification code can identify the specific device, a place where the device obtained the identification code, a specific manufacturer, a point of origin, or some other information that At step 404, the process 400 includes, upon determining that the particular component includes the identification code, determining whether the identification code matches an expected value. In some examples, the hardware component can be pre-loaded with expected values when the computing device is built. In some examples, the hardware component communicates with a security server on a network, and acquires expected values from the security server. In these examples, the hardware component can have a network interface that is used exclusively by the hardware component (e.g., the computing device includes a separate network interface for all other network operations).

In some examples, the hardware component decrypts the identification code before determining whether the identification code matches the expected value. In some examples, the security server provides an encryption key that the hardware component can use to decrypt the identification key.

At step 410, the process 400 includes configuring the particular component based on whether the identification code matches the expected identification code. The identity of the particular component is attested to when the identification code matches the expected value. Attestation, in this context, means that the identity of the particular component has been verified. In various examples, when the identity of the particular component can be attested to, the particular component is allowed to boot, and, when the identity of the particular component cannot be attested to, the particular component is disabled. The device can be disabled, for example, by disconnecting the device from a power source. As another example, the device can be disabled by holding the device in reset. When the particular component is allowed to boot, the computing device will be able to discover and use the device.

In some examples, when the identity of the device cannot be attested to, the hardware component disables the computing device from operating. For example, the hardware component can disconnect the power from the compute device's motherboard or hold the central processing unit in reset. Non-operation of the computing device itself can alert system administrators that the hardware component has found a problem with the computing device.

In some examples, the process 400 can further include identifying a second device directly coupled to the computing device, and determining that the second device does not include an identification code. In these examples, the process 400 can include disabling the second device, for example by disconnecting the power to the second device or holding the second device in reset.

In some examples, the hardware component powers on before the computing device's central processing unit. Doing so can enable the hardware component to perform hardware attestation, and to disable any untrusted devices, before the central processing unit attempts to identify devices attached to the computing device. In some examples, the hardware component can include a connector for connecting to a power source that is different from the power supply, which can enable the hardware component to boot first. In various examples, the computing device can include more than one power source, where one power sources is the primary power for the computing device. In these examples, the hardware component can use a secondary power source for power. In various examples, the computing device can be mounted in a rack that includes multiple power sources. In these examples, one power source may be "always available" meaning that the power is supplied regardless of whether the computing device is on, and another power source can be powered on only to power on the computing device.

Figure 5:
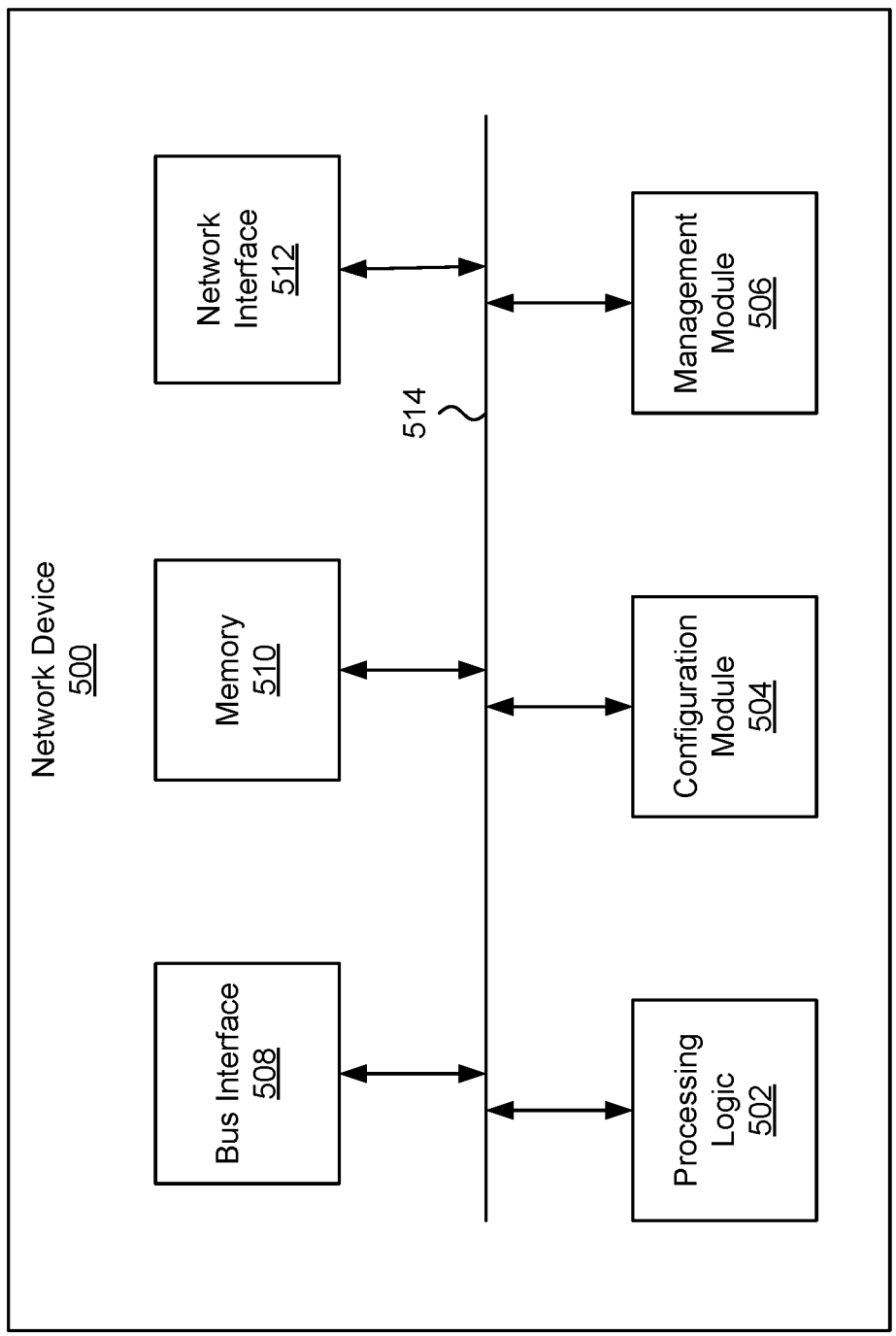
FIG. 5 illustrates an example of a network device.

FIG. 5 illustrates an example of a network device 500. Functionality and/or several components of the network device 500 may be used without limitation with other embodiments disclosed elsewhere in this disclosure, without limitations. A network device 500 may facilitate performance of hardware attestation, and other operations, such as processing of packets and/or forwarding of packets from the network device 500 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the network device 500 may be the recipient and/or generator of packets. In some implementations, the network device 500 may modify the contents of the packet before forwarding the packet to another device. The network device 500 may be a peripheral device coupled to another computer device, a switch, a router or any other suitable device enabled for receiving and forwarding packets.

In one example, the network device 500 may include processing logic 502, a configuration module 504, a management module 506, a bus interface module 508, memory 510, and a network interface module 512. These modules may be hardware modules, software modules, or a combination of hardware and software. In certain instances, modules may be interchangeably used with components or engines, without deviating from the scope of the disclosure. The network device 500 may include additional modules, not illustrated here, such as components discussed with respect to the nodes disclosed in FIG. 6. In some implementations, the network device 500 may include fewer modules. In some implementations, one or more of the modules may be combined into one module. One or more of the modules may be in communication with each other over a communication channel 514. The communication channel 514 may include one or more busses, meshes, matrices, fabrics, a combination of these communication channels, or some other suitable communication channel.

The processing logic 502 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 502 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 502 may be stored on a computer-readable storage medium, for example, in the form of a computer program. The computer-readable storage medium may be non-transitory. In some cases, the computer-readable medium may be part of the memory 510.

The memory 510 may include either volatile or non-volatile, or both volatile and non-volatile types of memory. The memory 510 may, for example, include random access memory (RAM), read only memory (ROM), Electrically Erasable Programmable Read-Only Memory (EEPROM), flash memory, and/or some other suitable storage media. In some cases, some or all of the memory 510 may be internal to the network device 500, while in other cases some or all of the memory may be external to the network device 500. The memory 510 may store an operating system comprising executable instructions that, when executed by the processing logic 502, provides the execution environment for executing instructions providing networking functionality for the network device 500. The memory may also store and maintain several data structures and routing tables for facilitating the functionality of the network device 500.

In some implementations, the configuration module 504 may include one or more configuration registers. Configuration registers may control the operations of the network device 500. In some implementations, one or more bits in the configuration register can represent certain capabilities of the network device 500. Configuration registers may be programmed by instructions executing in the processing logic 502, and/or by an external entity, such as a host device, an operating system executing on a host device, and/or a remote device. The configuration module 504 may further include hardware and/or software that control the operations of the network device 500.

In some implementations, the management module 506 may be configured to manage different components of the network device 500. In some cases, the management module 506 may configure one or more bits in one or more configuration registers at power up, to enable or disable certain capabilities of the network device 500. In certain implementations, the management module 506 may use processing resources from the processing logic 502. In other implementations, the management module 506 may have processing logic similar to the processing logic 502, but segmented away or implemented on a different power plane than the processing logic 502.

The bus interface module 508 may enable communication with external entities, such as a host device and/or other components in a computing system, over an external communication medium. The bus interface module 508 may include a physical interface for connecting to a cable, socket, port, or other connection to the external communication medium. The bus interface module 508 may further include hardware and/or software to manage incoming and outgoing transactions. The bus interface module 508 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 508 may include the physical layer for any of these bus protocols, including a connector, power management, and error handling, among other things. In some implementations, the network device 500 may include multiple bus interface modules for communicating with multiple external entities. These multiple bus interface modules may implement the same local bus protocol, different local bus protocols, or a combination of the same and different bus protocols.

The network interface module 512 may include hardware and/or software for communicating with a network. This network interface module 512 may, for example, include physical connectors or physical ports for wired connection to a network, and/or antennas for wireless communication to a network. The network interface module 512 may further include hardware and/or software configured to implement a network protocol stack. The network interface module 512 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network device 500 may include multiple network interface modules, each configured to communicate with a different network. For example, in these implementations, the network device 500 may include a network interface module for communicating with a wired Ethernet network, a wireless 802.11 network, a cellular network, an Infiniband network, etc.

The various components and modules of the network device 500, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 6.

Figure 6:
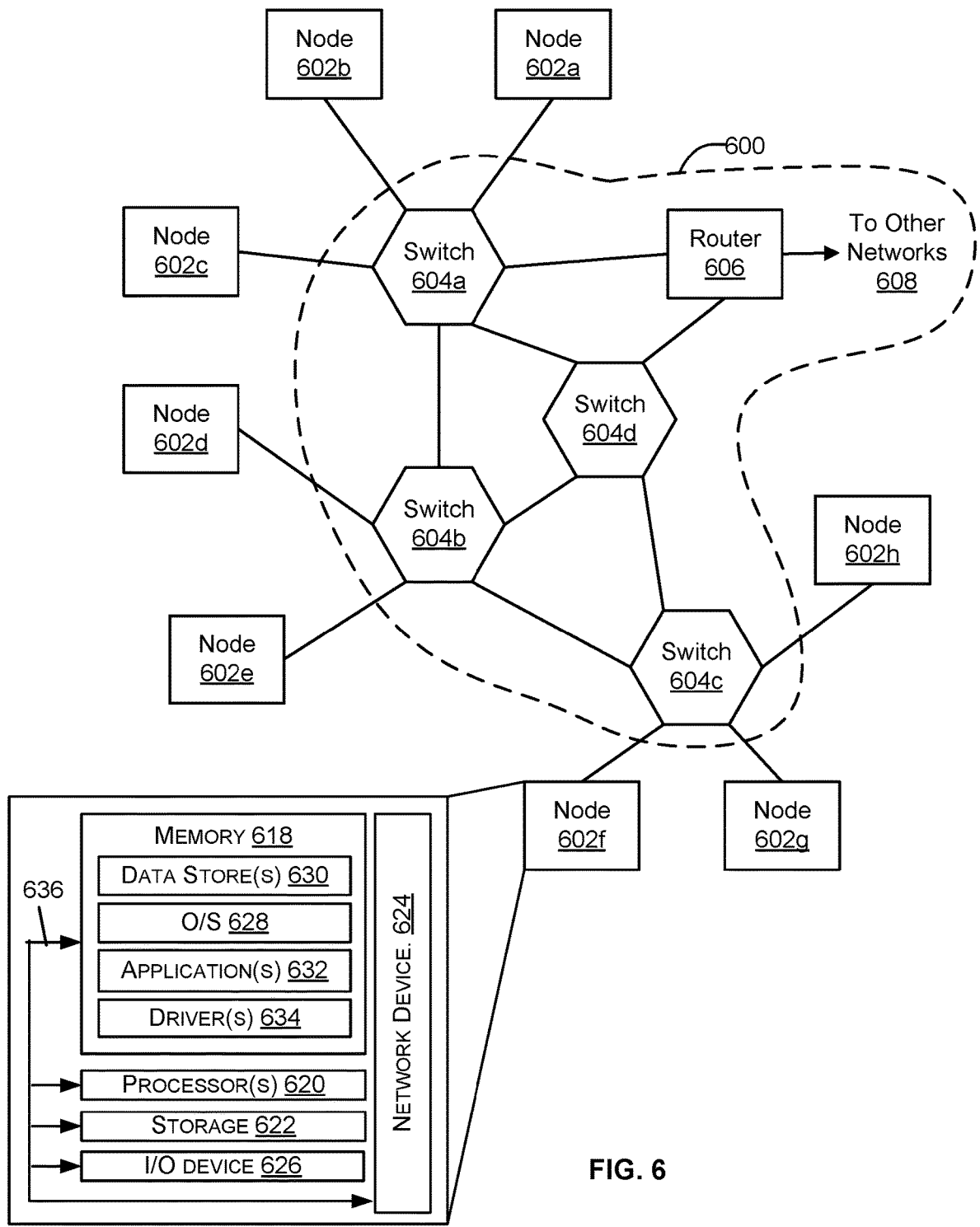
FIG. 6 illustrates an example architecture for features and systems described herein that includes one or more service provider computers and/or a user device connected via one or more networks, according to certain aspects of the disclosure.

FIG. 6 illustrates a network 600, illustrating various different types of network devices 500 of FIG. 5, such as nodes comprising the network device, switches and routers. In certain embodiments, the network 600 may be based on a switched architecture with point-to-point links. As illustrated in FIG. 6, the network 600 includes a plurality of switches 604a-604d, which may be arranged in a network. In some cases, the switches are arranged in a multi-layered network, such as a Clos network. A network device 500 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 604a-604d may be connected to a plurality of nodes 602a-602h and provide multiple paths between any two nodes.

The network 600 may also include one or more network devices 500 for connection with other networks 608, such as other subnets, LANs, wide area networks (WANs), or the Internet, and may be referred to as routers 606. Routers use headers and forwarding tables to determine the best path for forwarding the packets, and use protocols such as internet control message protocol (ICMP) to communicate with each other and configure the best route between any two devices.

In some examples, network(s) 600 may include any one or a combination of many different types of networks, such as cable networks, the Internet, wireless networks, cellular networks and other private and/or public networks. Interconnected switches 604a-604d and router 606, if present, may be referred to as a switch fabric, a fabric, a network fabric, or simply a network. In the context of a computer network, terms "fabric" and "network" may be used interchangeably herein.

Nodes 602a-602h may be any combination of host systems, processor nodes, storage subsystems, and I/O chassis that represent user devices, service provider computers or third party computers.

User devices may include computing devices to access an application 632 (e.g., a web browser or mobile device application). In some aspects, the application 632 may be hosted, managed, and/or provided by a computing resources service or service provider. The application 632 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 608. Additionally, the user device(s) may be part of the distributed system managed by, controlled by, or otherwise part of the service provider computer(s) (e.g., a console device integrated with the service provider computers).

The node(s) of FIG. 6 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 632 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 602a-602h may include at least one memory 618 and one or more processing units (or processor(s) 620). The processor(s) 620 may be implemented in hardware, computer-executable instructions, firmware, or combinations thereof Computer-executable instruction or firmware implementations of the processor(s) 620 may include computer-executable or machine-executable instructions written in any suitable programming language to perform the various functions described.

In some instances, the hardware processor(s) 620 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 618 may store program instructions that are loadable and executable on the processor(s) 620, as well as data generated during the execution of these programs. Depending on the configuration and type of the node(s) 602a-602h, the memory 618 may be volatile (such as RAM) and/or non-volatile (such as ROM, flash memory, etc.). The memory 618 may include an operating system 628, one or more data stores 630, one or more application programs 632, one or more drivers 634, and/or services for implementing the features disclosed herein.

The operating system 628 may support nodes 602a-602h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 628 may also be a proprietary operating system.

The data stores 630 may include permanent or transitory data used and/or operated on by the operating system 628, application programs 632, or drivers 634. Examples of such data include web pages, video data, audio data, images, user data, and so on. The information in the data stores 630 may, in some implementations, be provided over the network(s) 608 to user devices. In some cases, the data stores 630 may additionally or alternatively include stored application programs and/or drivers. Alternatively or additionally, the data stores 630 may store standard and/or proprietary software libraries, and/or standard and/or proprietary application user interface (API) libraries. Information stored in the data stores 630 may be machine-readable object code, source code, interpreted code, or intermediate code.

The drivers 634 include programs that may provide communication between components in a node. For example, some drivers 634 may provide communication between the operating system 628 and additional storage 622, network device 624, and/or I/O device 626. Alternatively or additionally, some drivers 634 may provide communication between application programs 632 and the operating system 628, and/or application programs 632 and peripheral devices accessible to the service provider computer. In many cases, the drivers 634 may include drivers that provide well-understood functionality (e.g., printer drivers, display drivers, hard disk drivers, Solid State Device drivers). In other cases, the drivers 634 may provide proprietary or specialized functionality.

The service provider computer(s) or servers may also include additional storage 622, which may include removable storage and/or non-removable storage. The additional storage 622 may include magnetic storage, optical disks, solid state disks, flash memory, and/or tape storage. The additional storage 622 may be housed in the same chassis as the node(s) 602a-602h or may be in an external enclosure. The memory 618 and/or additional storage 622 and their associated computer-readable media may provide non-volatile storage of computer-readable instructions, data structures, program modules, and other data for the computing devices. In some implementations, the memory 618 may include multiple different types of memory, such as SRAM, DRAM, or ROM.

The memory 618 and the additional storage 622, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 618 and the additional storage 622 are examples of computer storage media. Additional types of computer storage media that may be present in the node(s) 602a-602h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 602a-602h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 602a-602h may also include I/O device(s) 626, such as a keyboard, a mouse, a pen, a voice input device, a touch input device, a display, speakers, a printer, and the like. The node(s) 602a-602h may also include one or more communication channels 636. A communication channel 636 may provide a medium over which the various components of the node(s) 602a-602h can communicate. The communication channel or channels 636 may take the form of a bus, a ring, a switching fabric, or a network.

The node(s) 602a-602h may also contain network device (s) 624 that allow the node(s) 602a-602h to communicate with a stored database, another computing device or server, user terminals and/or other devices on the network(s) 600. The network device(s) 624 of FIG. 6 may include similar components discussed with reference to the network device 500 of FIG. 5.

In some implementations, the network device 624 is a peripheral device, such as a PCI-based device. In these implementations, the network device 624 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 508 may implement NVMe, and the network device 624 may be connected to a computing system using a PCIe interface.

A PCI-based device may include one or more functions. A "function" describes operations that may be provided by the network device 624. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 624 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 5, FIG. 6, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A server computer, comprising:
   a motherboard;
   a processor coupled to the motherboard;
   a memory card coupled to a memory-specific connector on the motherboard;
   a peripheral device coupled to an Input/Output (I/O) connector on the motherboard;
   a power supply coupled to a power supply connector on the motherboard; and
   a hardware component including a processor and a memory, wherein the hardware component is coupled to the motherboard, and wherein the memory includes instructions that, when executed by the processor of the hardware component causes the processor of the hardware component to perform operations including:
  identifying a device attached to the motherboard;
  reading a value from a memory location on the device, the value having been stored on the device during a configuration process performed prior to attaching the device to the motherboard;
  determining that the value is a valid value;
  compare the value to an expected value, wherein a result of the comparison determines whether the value is an identification code for the device, and wherein the identification code is used to attest to an identity of the device; and
  configuring the device based on whether the value matches the expected value.

2. The server computer of claim 1, wherein the hardware component includes a connector for connecting to a power source that is different from the power supply.

3. The server computer of claim 1, wherein the hardware component includes a network interface for exclusive use by the hardware component.

4. The server computer of claim 1, wherein the hardware component is operable to communicate with a security server on a network, wherein the security server provides an encryption key that the hardware component can use to decrypt the value.

5. A hardware component, comprising:
  a processor; and
  a memory;
  wherein the hardware component is configured to be coupled to a motherboard of a computing device that includes a plurality of components connected to the motherboard, the plurality of components including a processor operable to function as a central processing unit of the computing device;
  and wherein the memory includes instructions that, when executed by the processor of the hardware component, causes the processor of the hardware component to perform operations including:
    determining whether a particular component connected to the motherboard includes an identification code, wherein the identification code is used to attest to an identity of the particular component, and wherein the identification code is read from a memory location on the particular component, the identification code having been stored on the particular component during a configuration process performed prior to connecting the particular component to the motherboard, wherein determining whether the particular component includes the identification code includes determining that a valid value is stored at the memory location;
    upon determining that the particular component includes the identification code, determining whether the identification code matches an expected value; and
    configuring the particular component based on whether the identification code matches the expected value.

6. The hardware component of claim 5, wherein the identification code matches the expected value, and wherein configuring the particular component includes allowing the particular component to boot.

7. The hardware component of claim 5, wherein the identification code does not match the expected value, and wherein configuring the particular component includes disabling the particular component.

8. The hardware component of claim 7, wherein the particular component is disabled by disconnecting the particular component from a power source.

9. The hardware component of claim 7, wherein the particular component is disabled by holding the particular component in reset.

10. The hardware component of claim 5, wherein, when the identity of the particular component cannot be attested to, the hardware component disables the computing device from operating.

11. The hardware component of claim 5, wherein the memory further includes instructions that, when executed by the processor of the hardware component, cause the processor to perform operations including:
  determining that a second component connected to the motherboard does not include an identification code; and
  disabling the second component.

12. The hardware component of claim 5, wherein the memory of the hardware component further includes instructions that, when executed by the processor of the hardware component, cause the processor to perform operations including:
  decrypting the identification code before determining whether the identification code matches the expected value.

13. The hardware component of claim 5, wherein the hardware component powers on before the processor.

14. The hardware component of claim 5, wherein the hardware component identifies the particular component when the computing device is powered on.

15. The hardware component of claim 5, wherein the hardware component identifies the particular component when the hardware components detects that the particular component has been hot-plugged to the computing device.

16. The hardware component of claim 5, wherein the hardware component is an integrated circuit affixed to a motherboard of the computing device.

17. The hardware component of claim 5, wherein the hardware component is a peripheral device connected to a slot on the motherboard.

18. The hardware component of claim 5, wherein the particular component is a memory card, a power supply component, or an input/output device.

19. A computer-implemented method, comprising:
  determining, by a hardware component in a computing device, whether a particular component connected to a motherboard of the computing device includes an identification code, wherein the identification code is used to attest to an identity of the particular component, and wherein the identification code is read from a memory location on the particular component, the identification code having been stored on the particular component during a configuration process performed prior to connecting the particular component to the motherboard, wherein determining whether the particular component includes the identification code includes determining that a valid value is stored at the memory location;
  upon determining that the particular component includes the identification code, determining whether the identification code matches an expected value; and
  configuring the particular component based on whether the identification code matches the expected value.

20. The computer-implemented method of claim 19, wherein determining whether the particular component includes the identification code includes determining that the memory location is not being used for another purpose.

21. The computer-implemented method of claim 19, wherein, when the identity of the particular component is attested to, the particular component is allowed to boot, and wherein, when the identity of the particular component cannot be attested to, the particular component is disabled.

22. The computer-implemented method of claim 19, wherein the identity of the particular component is attested to when the identification code matches the expected value.

* * * * *